United States Patent
Inada

(10) Patent No.: US 12,106,507 B2
(45) Date of Patent: Oct. 1, 2024

(54) POSITION DETECTION SYSTEM, IMAGE PROCESSING DEVICE, POSITION DETECTION METHOD, AND POSITION DETECTION PROGRAM

(71) Applicant: Sony Interactive Entertainment Inc., Tokyo (JP)

(72) Inventor: Tetsugo Inada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 277 days.

(21) Appl. No.: 17/595,805

(22) PCT Filed: Jun. 21, 2019

(86) PCT No.: PCT/JP2019/024797
§ 371 (c)(1),
(2) Date: Nov. 24, 2021

(87) PCT Pub. No.: WO2020/255399
PCT Pub. Date: Dec. 24, 2020

(65) Prior Publication Data
US 2022/0222845 A1    Jul. 14, 2022

(51) Int. Cl.
*H04N 23/957* (2023.01)
*G06T 7/20* (2017.01)
(Continued)

(52) U.S. Cl.
CPC .............. *G06T 7/70* (2017.01); *G06T 7/20* (2013.01); *H04N 23/957* (2023.01);
(Continued)

(58) Field of Classification Search
None
See application file for complete search history.

(56) References Cited

U.S. PATENT DOCUMENTS

| 9,383,548 B2 | 7/2016 | Steven |
| 9,389,693 B2 | 7/2016 | Lee |
| (Continued) |

FOREIGN PATENT DOCUMENTS

| CN | 105432072 A | 3/2016 |
| CN | 105807550 A | 7/2016 |
| (Continued) |

OTHER PUBLICATIONS

Notice of Reasons for Refusal for corresponding JP Application No. 2021-528617, 6 pages, dated Sep. 14, 2022.
(Continued)

*Primary Examiner* — Paul M Berardesca
(74) *Attorney, Agent, or Firm* — Matthew B. Dernier, Esq.

(57) ABSTRACT

A position detection system includes an event-driven vision sensor that includes a sensor array including sensors each generating an event signal when a change in the intensity of incident light is detected, a microlens array that includes at least first and second microlenses for guiding the light to first and second regions of the sensor array, respectively, and a terminal device that has a reception unit for receiving the event signal from the vision sensor and a position detection unit for detecting the three-dimensional position of the change in the intensity of light, from the event signal generated by each sensor in the first region and the second region.

5 Claims, 4 Drawing Sheets

(51) Int. Cl.
*G06T 7/70* (2017.01)
*H04N 25/47* (2023.01)

(52) U.S. Cl.
CPC ......... *H04N 25/47* (2023.01); *G06T 2200/04* (2013.01); *G06T 2207/10012* (2013.01)

(56) References Cited

U.S. PATENT DOCUMENTS

| | | | |
|---|---|---|---|
| 9,952,323 | B2 | 4/2018 | Deane |
| 10,057,498 | B1* | 8/2018 | Nunnink ................. H04N 23/70 |
| 10,274,426 | B2 | 4/2019 | Arbore |
| 10,277,888 | B2 | 4/2019 | Campbell |
| 10,863,098 | B2 | 12/2020 | Priyantha |
| 11,122,224 | B2 | 9/2021 | Suh |
| 2014/0320403 | A1 | 10/2014 | Lee |
| 2014/0375820 | A1 | 12/2014 | Priyantha |
| 2015/0077585 | A1 | 3/2015 | Kobayashi |
| 2015/0285625 | A1 | 10/2015 | Deane |
| 2015/0334269 | A1* | 11/2015 | Yokota ................. B60W 30/09 382/103 |
| 2015/0362698 | A1 | 12/2015 | Lansel |
| 2016/0080670 | A1 | 3/2016 | Rangan |
| 2016/0212410 | A1 | 7/2016 | Campbell |
| 2016/0335775 | A1* | 11/2016 | Zhang .................... G06V 20/10 |
| 2016/0360182 | A1 | 12/2016 | Seifi |
| 2017/0098132 | A1* | 4/2017 | Yokota .................... G06T 7/194 |
| 2017/0223332 | A1 | 8/2017 | Guo |
| 2018/0017491 | A1 | 1/2018 | Arbore |
| 2018/0146149 | A1 | 5/2018 | Suh |
| 2019/0318486 | A1* | 10/2019 | Gupta ..................... G06T 7/285 |
| 2019/0361259 | A1* | 11/2019 | Sapienza ................. G06T 7/521 |

FOREIGN PATENT DOCUMENTS

| | | | |
|---|---|---|---|
| CN | 106165399 | A | 11/2016 |
| CN | 107209116 | A | 9/2017 |
| CN | 107302695 | A | 10/2017 |
| JP | H08280864 | A * | 10/1996 |
| JP | 2011099779 | A | 5/2011 |
| JP | 2014535098 | A | 12/2014 |
| JP | 2017519440 | A | 7/2017 |
| JP | 2017520134 | A | 7/2017 |
| JP | 2017533497 | A | 11/2017 |
| JP | 2018509030 | A | 3/2018 |
| JP | 2018085725 | A | 5/2018 |
| JP | 2019092145 | | 6/2019 |
| WO | 2014204993 | A1 | 12/2014 |
| WO | 2018141414 | A1 | 8/2018 |
| WO | 2018218298 | A1 | 12/2018 |
| WO | 2019012660 | | 1/2019 |

OTHER PUBLICATIONS

Extended European Search Report for corresponding EP Application No. 19933874.0, 8 pages, dated Dec. 9, 2022.
Guillermo Gallego, et al., "Event-based Vision: A Survey", arxiv. org, Cornell University Library, 25 pages, dated Apr. 17, 2019 (for relevancy see Non-Pat. Lit. #1).
International Search Report for corresponding PCT Application No. PCT/JP2019/024797, 4 pages, dated Sep. 17, 2019.
The First Office Action for corresponding CN Application No. 201980097517.8, 26 pages, dated Apr. 1, 2024.

* cited by examiner

10

POSITION DETECTION SYSTEM, IMAGE PROCESSING DEVICE, POSITION DETECTION METHOD, AND POSITION DETECTION PROGRAM

TECHNICAL FIELD

The present invention relates to a position detection system, an image processing device, a position detection method, and a position detection program.

BACKGROUND ART

An event-driven vision sensor in which a pixel having detected a change in the intensity of incident light generates a signal in a time-asynchronous manner has been known. The event-driven vision sensor is advantageous in that the event-driven vision sensor can operate at a low power and a high speed as compared with a frame-type vision sensor that scans all pixels at each predetermined cycle, specifically, an image sensor such as a charge coupled device (CCD) or a complementary metal oxide semiconductor (CMOS). A technique relating to such an event-driven vision sensor is described in, for example, PTL 1 and PTL 2.

CITATION LIST

Patent Literature

PTL 1 Japanese Translation of PCT for Patent No. 2014-535098 PTL 2 Japanese Patent Laid-open No. 2018-85725

SUMMARY

Technical Problem

However, regarding the event-driven vision sensor, the advantages as described above have been known, but it is difficult to say that utilization methods in combination with other devices have yet been sufficiently proposed.

Accordingly, an object of the present invention is to provide a position detection system, an image processing device, a position detection method, and a position detection program that can obtain advantageous effects by using an event-driven vision sensor in combination with a microlens array.

Solution to Problem

According to an aspect of the present invention, provided is a position detection system including an event-driven vision sensor that includes a sensor array including sensors each generating an event signal when a change in intensity of incident light is detected, a microlens array that includes at least first and second microlenses for guiding the light to first and second regions of the sensor array, respectively, and a terminal device that has a reception unit for receiving the event signal from the vision sensor, and a position detection unit for detecting a three-dimensional position of the change in the intensity of light, from the event signal generated by each sensor in the first region and the second region.

According to another aspect of the present invention, provided is an image processing device including a reception unit that receives an event signal from an event-driven vision sensor including a sensor array including sensors each generating the event signal when a change in intensity of incident light is detected via a microlens array, and a position detection unit that detects a three-dimensional position of the change in the intensity of light, from the event signals. The microlens array includes at least first and second microlenses for guiding the light to first and second regions of the sensor array, respectively. The position detection unit detects the three-dimensional position, from the event signal generated by each sensor in the first region and the second region.

According to still another aspect of the present invention, provided is a position detection method including a step of receiving an event signal from an event-driven vision sensor including a sensor array including sensors each generating the event signal when a change in intensity of incident light is detected via a microlens array, and a step of detecting a three-dimensional position of the change in the intensity of light, from the event signals. The microlens array includes at least first and second microlenses for guiding the light to first and second regions of the sensor array, respectively. In the step of detecting the three-dimensional position, the three-dimensional position is detected from the event signal generated by each sensor in the first region and the second region.

According to still another aspect of the present invention, provided is a position detection program that causes a computer to realize a function of receiving an event signal from an event-driven vision sensor including a sensor array including sensors each generating the event signal when a change in intensity of incident light is detected via a microlens array, and a function of detecting a three-dimensional position of the change in the intensity of light, from the event signals. The microlens array includes at least first and second microlenses for guiding the light to first and second regions of the sensor array, respectively. The function of detecting the three-dimensional position detects the three-dimensional position, from the event signal generated by each sensor in the first region and the second region.

DESCRIPTION OF EMBODIMENTS

Hereinafter, several embodiments of the present invention will be described in detail with reference to the accompanying drawings. It should be noted that, in the specification and the drawings, constitutional elements having substantially the same functional configurations will be denoted by the same reference signs, and duplicated description thereof will be omitted.

Figure 1:
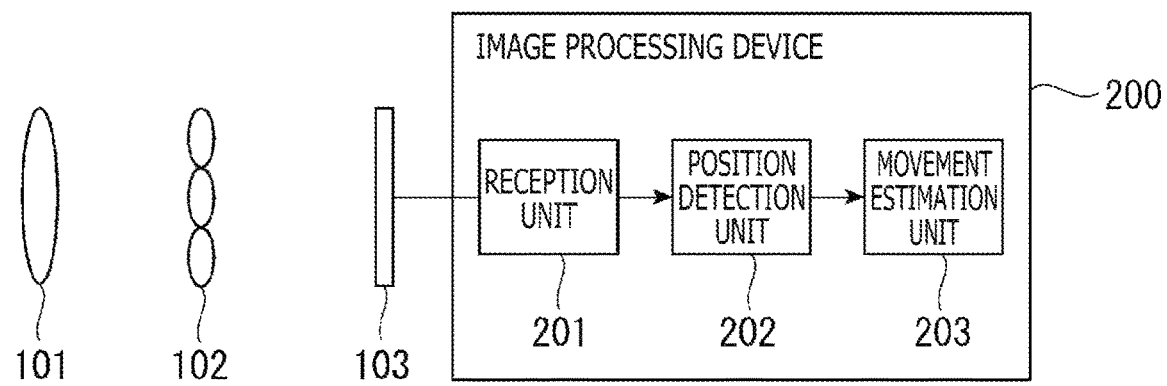
FIG. 1 is a block diagram for depicting a schematic configuration of a system according to an embodiment of the present invention.
Figure 2:
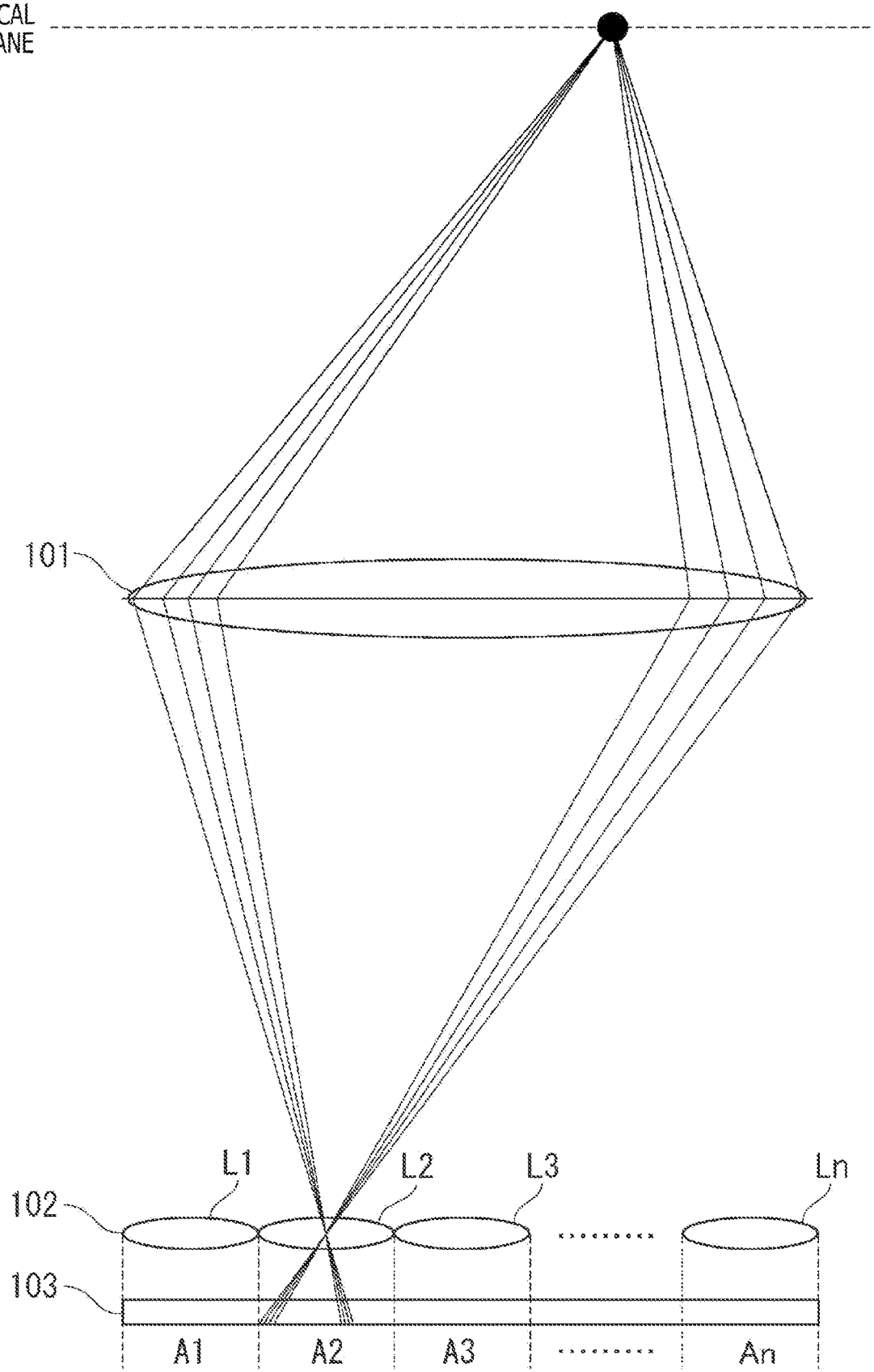
FIG. 2 is a diagram for depicting a photographic optical system of the system depicted in FIG. 1.

FIG. 1 is a block diagram for depicting a schematic configuration of a position detection system according to an embodiment of the present invention. FIG. 2 is a diagram for depicting a photographic optical system of the system depicted in FIG. 1. As depicted in FIG. 1, a position detection system 10 includes a photographic lens 101, a microlens array 102, an event driven sensor (EDS) 103 that is an event-driven vision sensor, and an image processing device 200. The photographic lens 101 is a main lens for imaging an object to be targeted for position detection and includes a general imaging lens. As depicted in FIG. 2, the microlens array 102 is arranged on an imaging surface of the photographic lens 101 and is obtained by two-dimensionally arraying a plurality of microlenses. Each microlens has, for example, a circular planar shape, and includes, for example, a solid lens, a liquid crystal lens, a diffraction lens, or the like. It should be noted that microlenses L1, L2, . . . , Ln are one-dimensionally arrayed in the microlens array 12 depicted in FIG. 1 and FIG. 2, but actually the microlenses are two-dimensionally arrayed.

As depicted in FIG. 2, among light incident on the photographic lens 101, the light having passed through a first microlens L1 included in the microlens array 102 is guided to a first region A1 on a sensor array of the EDS 103, and the light having passed through a second microlens L2 is guided to a second region A2 on the sensor array of the EDS 103. As similar to the above, the light having passed through the n-th microlens Ln is guided to an n-th region An on the sensor array of the EDS 103. In the microlens array 102 and the EDS 103, n pieces of regions A1, A2, . . . , An are arranged so as not to overlap with one another. In the EDS 103, m pieces of sensors are arranged in the respective regions A1, A2, . . . , An on the sensor array. It should be noted that the number m of sensors corresponding to the respective regions may be constant or may be partially different.

The EDS 103 is an example of a vision sensor that generates an event signal when the sensor detects a change in the intensity of light. The EDS 103 includes sensors, not depicted, configuring the sensor array and a processing circuit, not depicted, connected to the sensors. Each sensor includes a light receiving element and generates an event signal when detecting a change in the intensity of incident light, more specifically, a change in luminance (for example, occurring at an edge portion of an object). Since the sensor that has not detected the change in the intensity of incident light does not generate the event signal, the event signal is generated in the EDS 103 in a time-asynchronous manner. The event signal output via the processing circuit includes sensor identification information (for example, the position of a pixel), the polarity of a change in luminance (rising or falling), a time stamp, and the like.

Here, the EDS 103 generates the event signal for each sensor. Therefore, if the sensor identification information (for example, the position of a pixel) is associated with each of the regions A1, A2, . . . , An on the sensor array in advance, it is possible to specify which of the microlenses L1, L2, . . . , Ln in the microlens array 102 the generated event signal corresponds to. In addition, if the sensor identification information (for example, the position of a pixel) is associated with a position in each of the regions A1, A2, . . . , An of the sensors in advance, it is possible to specify from which viewpoint the generated event signal has been observed.

The image processing device 200 includes functions of a reception unit 201, a position detection unit 202, and a movement estimation unit 203 that are implemented by a computer having, for example, a communication interface, a processor, and a memory and realized by the processor operating according to a program stored in the memory or received via the communication interface. Hereinafter, the function of each unit will be further described.

The reception unit 201 receives the event signals from the EDS 103 in a wired or wireless manner. As described above, the event signals are generated by the sensors of the EDS 103. The sensors of the EDS 103 include sensors arranged in regions where each light is guided by at least two microlenses included in the microlens array 102, and the reception unit 201 receives each event signal generated by the sensor in each region.

The position detection unit 202 detects the three-dimensional position of an event, that is, a change in the intensity of light (hereinafter, also referred to as a three-dimensional position where the event occurred or an event position), from the event signals received by the reception unit 201. More specifically, the position detection unit 202 detects the three-dimensional position where the event occurred by reconstructing the event signals from the sensors in the regions A1, A2, . . . , An of the EDS 103 on the basis of the known positional relation between the photographic lens 101 and the microlens array 102. In other words, the position detection unit 202 treats the event signals from the sensors in the regions A1, A2, . . . , An of the EDS 103 as information indicating a two-dimensional event position observed from m pieces of viewpoints, and detects the three-dimensional position where the event occurred by utilizing parallaxes among these viewpoints.

Here, since the three-dimensional position can be detected from the event signals observed from two or more viewpoints mutually having parallaxes, the position detection unit 202 can detect the three-dimensional position where the event occurred if there are event signals generated by the respective sensors arranged in the regions (first and second regions) where each light is guided by at least two microlenses (first and second microlenses). Further, detection accuracy can be further improved by utilizing the event signals observed from three or more viewpoints mutually having parallaxes. Therefore, the position detection unit 202 may detect the three-dimensional position where the event occurred, on the basis of the event signals generated by the respective sensors arranged in the regions where each light is guided by three or more microlenses.

The movement estimation unit 203 continuously acquires the detection result of the event position by the position detection unit 202 and estimates the movement of the event position on the basis of time-series detection results. For example, the movement estimation unit 203 may express the movement of the event position in a predetermined period by using a vector, on the basis of time-series changes in the three-dimensional position where the event occurred. Further, the movement estimation unit 203 may estimate the movement of the event position in the future from time-series changes in the past event position. For example, the movement of the event position in the future thus estimated can be utilized for, for example, the future position prediction of an object being present at the event position.

Figure 3:
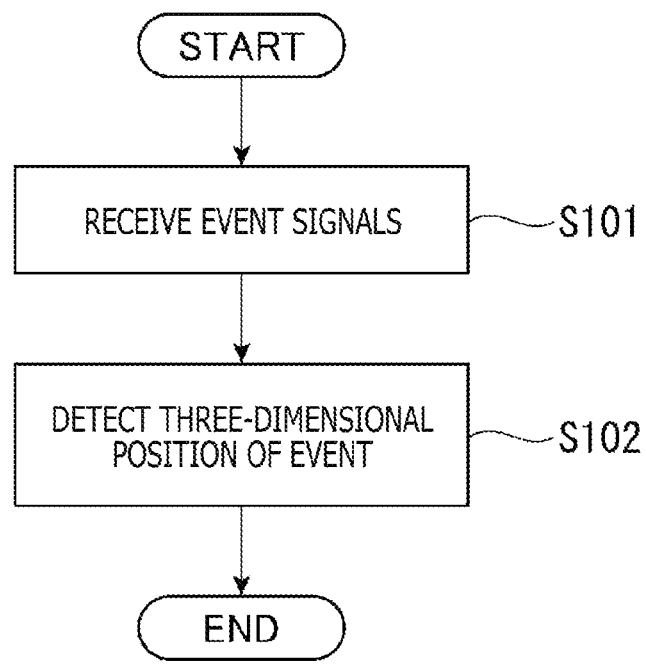
FIG. 3 is a flowchart for depicting an example of a position detection method according to the embodiment of the present invention.

FIG. 3 is a flowchart for depicting an example of a position detection method according to the embodiment of the present invention. In the illustrated example, the reception unit 201 of the image processing device 200 receives event signals generated by the sensors of the EDS 103 (Step S101). The event signals received at this time include an event signal necessary for specifying a two-dimensional event position observed from at least two viewpoints. Next, the position detection unit 202 detects the three-dimensional position where the event occurred, on the basis of the event signals received in Step S101 (Step S102). As described above, the three-dimensional position of the event can be detected by obtaining information indicating the two-dimensional event position observed from at least two viewpoints.

Figure 4:
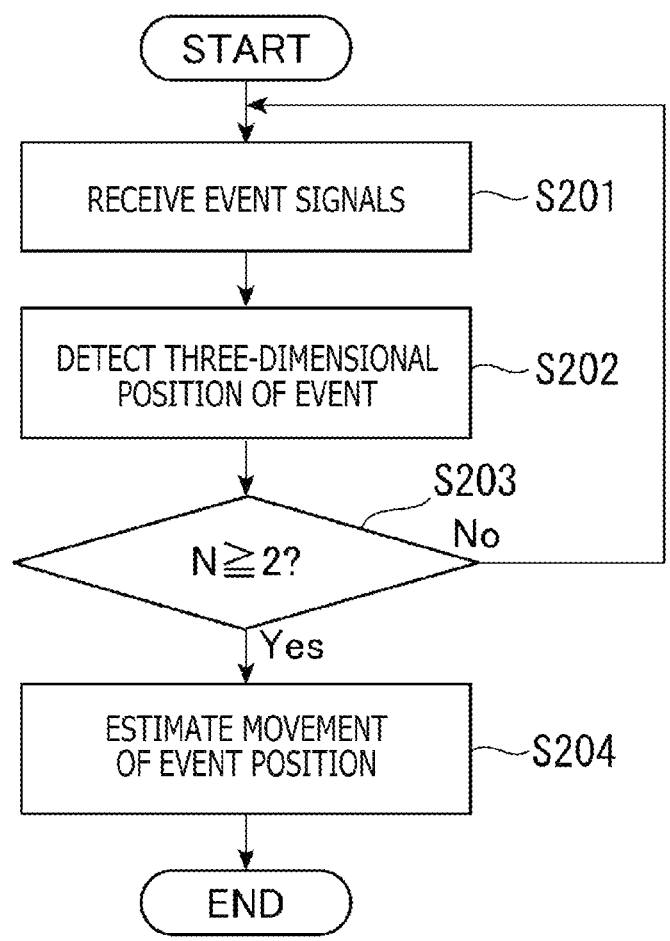
FIG. 4 is a flowchart for depicting another example of the position detection method according to the embodiment of the present invention.

FIG. 4 is a flowchart for depicting another example of the position detection method according to the embodiment of the present invention. In the illustrated example, as similar to the example of FIG. 3, the reception unit 201 of the image processing device 200 receives event signals (Step S201), and the position detection unit 202 detects the three-dimensional position where the event occurred, on the basis of the received event signals (Step S202). Further, the movement estimation unit 203 determines whether or not the number N of times of detection of the three-dimensional position is two or more (Step S203), and estimates the movement of the event position in a case where the number N is two or more (Step S204). As described above, the movement of the event position is estimated from changes in the three-dimensional position of the event detected twice or more.

In the embodiment of the present invention as described above, since the EDS 103 detects a change in the intensity of incident light via the microlens array 102, the event position can be accurately detected at a high frame rate on the basis of the information of the occurrence position of the event observed from a plurality of viewpoints. Further, high prediction accuracy can be realized in, for example, the future position prediction of an object being present at the event position by estimating the event position on the basis of the time-series detection results of the event position. It is conceivable that the estimation result by the movement estimation unit 203 is used for, for example, avoidance motion control for an approaching object, control of a moving speed and a traveling direction according to an obstacle, and the like other than the above.

In addition, in the embodiment of the present invention, the movement of the event position can be estimated at a high frame rate and with high prediction accuracy by a combination of the microlens array 102 and the EDS 103. Since the event position can be specified by using the EDS 103 without image processing and since the latency of processing for an approaching object or the like is low and it is only necessary to arrange a single EDS 103 corresponding to the microlens array 102, the same processing as a case in which, for example, a plurality of cameras for obtaining a plurality of viewpoint images is arranged can be realized with space-saving. Further, since it can be determined on the basis of the event signals generated by the EDS 103 that a change in the intensity of light occurred, no additional configuration or control such as infrared (IR) irradiation or an auxiliary light source is required.

It should be noted that the position detection system 10 described in the above example may be implemented in a single device, or may be dispersedly implemented in a plurality of devices. For example, the entire position detection system 10 may be implemented in a robot, a drone, or a terminal device including a wearable terminal or the like, or the image processing device 200 may be dispersedly implemented in server devices.

In addition, in the position detection system 10 described in the above example, the example in which the microlens array 102 is arranged on the imaging surface of the photographic lens 101 has been depicted, but other arrangements may be employed. For example, the microlens array 102 may be arranged away from the imaging surface of the photographic lens 101, and a change in the intensity of light may be detected by the EDS 103 via the microlens array 102 on the basis of a virtual image on the imaging surface of the photographic lens 101.

In addition, regarding the microlens array 102 of the position detection system 10 described in the above example, if each microlens is associated with a region on the sensor array of the EDS 103, each microlens configuring the microlens array 102 may have a uniform focal distance, or microlenses having different focal distances may be regularly or irregularly arranged to configure the microlens array 102.

Although several embodiments of the present invention have been described above in detail with reference to the accompanying drawings, the present invention is not limited to such examples. It is clear that a person ordinarily skilled in the art to which the present invention belongs can perceive various change examples and modification examples within the scope of the technical idea described in the claims, and it can be understood that these obviously belong to the technical range of the present invention.

REFERENCE SIGNS LIST

10: Position detection system
101: Photographic lens
102: Microlens array
103: EDS
200: Image processing device
201: Reception unit
202: Position detection unit
203: Movement estimation unit

The invention claimed is:
1. A position detection system comprising:
an event-driven vision sensor that includes a sensor array including sensors each generating an event signal when a change in intensity of incident light is detected;
a microlens array that includes at least first and second microlenses for guiding the light to first and second regions of the sensor array, respectively; and
a terminal device that has a reception unit for receiving the event signal from the vision sensor, and a position detection unit for detecting a three-dimensional position of the change in the intensity of light, from the event signal generated by each sensor in the first region and the second region;
wherein as to each sensor of the sensor array, sensor identification information of a respective event output signal for the sensor is associated in advance with a respective one of the regions on the sensor array so as to specify a respective one of the microlenses to which the event output signal corresponds.

2. An image processing device comprising:
a reception unit that receives an event signal from an event-driven vision sensor including a sensor array including sensors each generating the event signal when a change in intensity of incident light is detected via a microlens array; and
a position detection unit that detects a three-dimensional position of the change in the intensity of light, from the event signals,
wherein the microlens array includes at least first and second microlenses for guiding the light to first and second regions of the sensor array, respectively, and the position detection unit detects the three-dimensional position, from the event signal generated by each sensor in the first region and the second region;
wherein as to each sensor of the sensor array, sensor identification information of a respective event output signal for the sensor is associated in advance with a respective one of the regions on the sensor array so as to specify a respective one of the microlenses to which the event output signal corresponds.

3. The image processing device according to claim 2, further comprising: a movement estimation unit that continuously acquires a detection result by the position detection unit and determines whether a number of times of detecting the three-dimensional position is more than a predetermined number, and when the number of times is more than the predetermined number, estimates a movement of the three-dimensional position on a basis of time-series detection results.

4. A position detection method comprising:
  receiving an event signal from an event-driven vision sensor including a sensor array including sensors each generating the event signal when a change in intensity of incident light is detected via a microlens array; and
  detecting a three-dimensional position of the change in the intensity of light, from the event signals,
  wherein, the microlens array includes at least first and second microlenses for guiding the light to first and second regions of the sensor array, respectively, and,
  the detecting the three-dimensional position includes detecting the three-dimensional position from the event signal generated by each sensor in the first region and the second region;
  wherein as to each sensor of the sensor array, sensor identification information of a respective event output signal for the sensor is associated in advance with a respective one of the regions on the sensor array so as to specify a respective one of the microlenses to which the event output signal corresponds.

5. A non-transitory, computer readable storage medium containing a position detection program, which when executed by a computer, causes the computer to perform a position detection method by carrying out actions, comprising:
  receiving an event signal from an event-driven vision sensor including a sensor array including sensors each generating the event signal when a change in intensity of incident light is detected via a microlens array; and
  detecting a three-dimensional position of the change in the intensity of light, from the event signals,
  wherein the microlens array includes at least first and second microlenses for guiding the light to first and second regions of the sensor array, respectively, and
  the detecting the three-dimensional position includes detecting the three-dimensional position, from the event signal generated by each sensor in the first region and the second region;
  wherein as to each sensor of the sensor array, sensor identification information of a respective event output signal for the sensor is associated in advance with a respective one of the regions on the sensor array so as to specify a respective one of the microlenses to which the event output signal corresponds.

* * * * *